Figure 1:
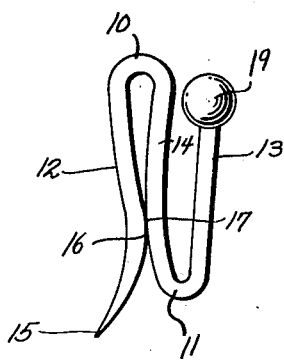

May 22, 1951            C. M. BLY            2,554,397

MAP MARKING PIN

Filed May 31, 1950

INVENTOR

CHARLEY M. BLY

BY *Wilkinson & Mawhinney*

ATTORNEYS

Patented May 22, 1951

2,554,397

UNITED STATES PATENT OFFICE 2,554,397

MAP MARKING PIN

Charley M. Bly, Arcadia, Fla.

Application May 31, 1950, Serial No. 165,190

2 Claims. (Cl. 116—136)

The present invention relates to improvements in a map marking pin and has for an object the provision of a pin of this kind which is adapted to designate locations on a map by being inserted into the map and is capable of maintaining its location designating position even though the map is not provided with a stiff backing.

Maps are used extensively, for example, by many business concerns, in connection with marking off territories or for other purposes. Heretofore, the type of pin or tack employed for marking these maps has had a straight shank which necessitated affixing a firm, stiff backing on the map in order to properly support the straight pin or tack in the map. The present invention contemplates the provision of an improved pin having cooperating parts that will grip the map therebetween so that the pin will remain efficiently in place because of its construction in the conventional paper, cloth, or any other fabric-constructed map without a stiff backing.

Another object of the present invention is to provide an improved map marking pin which can be readily inserted into a map and quickly withdrawn therefrom and is capable of being used repeatedly.

A further object of the present invention is to provide an improved pin of this character which will retain its operative position in a map not equipped with a backing against severe shaking jars, accidental brushing by the arm of a person and drafts of air or the like.

A still further object of the present invention is the provision of an improved map marking pin which is of simple construction, economical to manufacture and the heads of which can be made of different colors for the purpose of indicating different information on the map.

With the foregoing and other objects in view, the invention will be hereinafter more fully described and more particularly pointed out in the appended claims.

Figure 2:
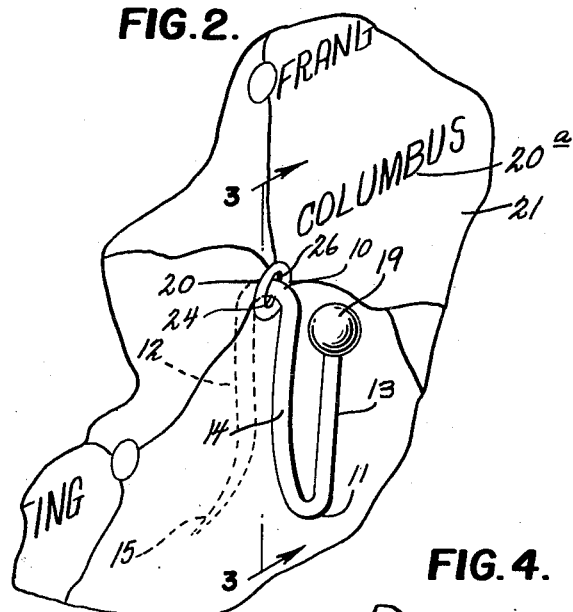
Figure 3:
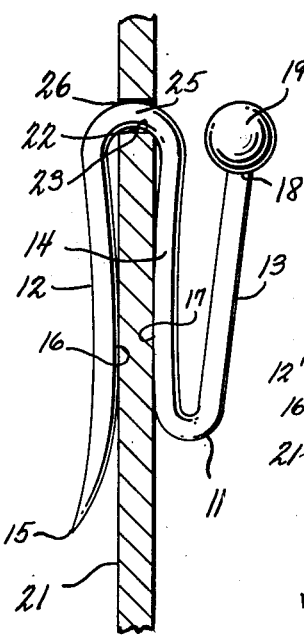
Figure 5:
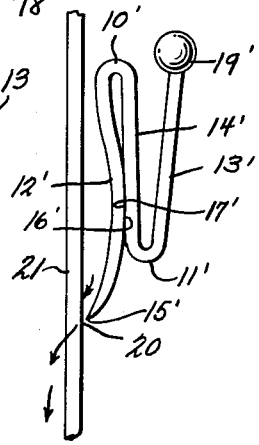
Figure 4:
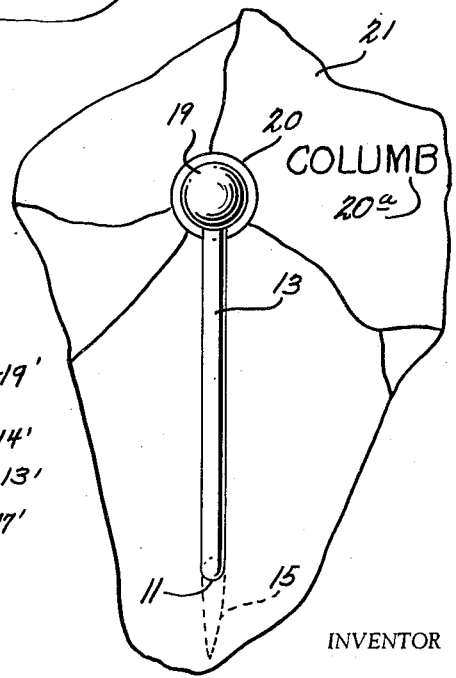

In the drawings, in which the same parts are denoted by the same reference numerals throughout the several views:

Figure 1 is a perspective view of the improved map marking pin constructed in accordance with the present invention, Figure 2 is a perspective view of the improved pin illustrated as applied to a map, a portion of which is shown, Figure 3 is a sectional view taken on the line 3—3 of Figure 2 and looking in the direction of the arrows, Figure 4 is a front elevational view of the improved pin illustrated as applied to a map, a portion of which is shown, and Figure 5 is a side elevational view of a modified form of the invention just prior to being inserted into a map, a portion of which is illustrated.

Referring more particularly to the drawing and especially to Figures 1 through 4, the improved pin may be formed from a single piece of wire or the like which is bent upon itself at two intermediate spaced apart areas to provide an inner loop or bend 10 and an outer loop or bend 11. The formation of these loops 10 and 11 will provide three substantially parallel spaced apart legs, namely, an inner or map piercing point supporting leg 12, an outer indicating head supporting leg 13 and an intermediate connecting leg 14 for joining the inner and outer legs 12 and 13.

The inner leg 12 has one end merging into the inner end of the inner loop 10 and its opposite free end portion extends beyond the apex of the outer loop 11 and extends inwardly therefrom at an angle of the order of thirty degrees. The extended portion of the inner leg 12 is sharpened to form a map penetrating or piercing point 15.

One end of the intermediate leg 14 joins or merges with the outer end of the inner loop 10 and its opposite end joins or merges with the inner end of the outer loop 11. The legs 12 and 14 curve towards each other and have areas of contact adjacent to the inner end of the outer loop 11 as indicated at 16 and 17 on the legs 12 and 14, respectively. The wire or other material from which the pin is made will possess sufficient resiliency so that the legs 12 and 14 will normally spring towards one another to bring their areas 16 and 17 into firm engagement.

One end of the leg 13 connects or merges with the outer end of the outer loop 11 and its opposite free end terminates short of the apex of the inner loop 10 as indicated at 18 so that the top of a head 19 which may be of any suitable shape, but is shown in the present illustration to be in the form of a ball, will be disposed in the same plane as the apex of the loop 10. The width of the loop 11 is such and the leg 13 projects outwardly therefrom at such an angle that the end 18 of the leg 13 will be disposed a sufficient distance from the loop 10 so that the head 19 will be clear of the loop 10 and will be spaced sufficiently far from the map so as not to interfere with the reading of the legend on the map. The leg 13 may be disposed at an angle of the order of thirty degrees to the loop 11 so that the leg is substantially parallel to the extended portion 15 of the leg 12 to facilitate the insertion of the pin into the map.

In the use of the device, assuming that it is desired to position a marking pin at the reference designation 20 for Columbus on a map 21, the user will grasp the head 19 of the pin between his thumb and forefinger and place the point 15 of the pin against the map at the designation 20 adjacent the legend "Columbus" indicated at 20a. If the map is hanging on a wall the pin will be applied to the map by pushing downward on the head 19, in the event the map is disposed on the top of a table, desk, or the like, the user will exert pressure upon the head 19 in a direction towards himself. The angular relation of the pointed portion 15 to the main portion of the pin will facilitate the piercing of the map.

The pin will then be moved until it attains the position shown in Figures 2, 3 and 4 of the drawings in which the closed face 22 of the inner loop 10 engages the opposed edge 23 of the opening 24 formed in the map by the insertion of the pin and the contact areas 16 and 17 of the legs 12 and 14 will engage the opposite faces of the map and tightly grip the map therebetween. When the pin has been brought to this position further movement of the pin in the direction of insertion will be arrested and bodily sidewise movement of the pin will be prevented. Pivotal movement of the pin about its contact at 16 and 17 with the map will be restricted to a negligible amount by the engagement of the opposite side faces 25 of the loop 10 with the opposite side edges 26 of the opening 24 in the map. It will be noted that the inner loop 10 will cooperate with the contact areas 16 and 17 of the legs 12 and 14 to maintain the pin in its initial established position against unintentional displacement.

When the pin is in this position the head 19 will be spaced from, but in direct line with, the selected reference designation 20 on the map so that the visual attention of an observer will be easily attracted to the pertinent location on the map. The heads of the pins may be made of different colors to convey different information to the users of the map. The head 19 will serve in a dual capacity, first as a grip when inserting the pin in the map and as a visual signal after the insertion of the pin in the map and the leg 14 serves to connect the loops 10 and 11 and also to cooperate with the leg 12 to grip the map.

The modified form of marking pin illustrated in Figure 5 of the drawing is the same as that shown in Figures 1 through 4, except that the leg 14' is substantially straight throughout its entire length and the leg 12' curves from the pointed end portion 15' towards the leg 14' in order that the contact areas 16' and 17' of the legs 12' and 14', respectively, will engage one another. The leg 13' extends from the outer loop 11' at a sufficient angle, for example, at an angle of the order of thirty degrees so that the head 19' clears the inner loop 10'. The free end of the leg 13' terminates short of the apex of the inner loop 10' so that the center of the head 19' will lie in the same plane as the apex of the inner loop 10'.

The use of this form of the invention will be the same as that described above in connection with the pin illustrated in Figures 1 through 4.

The improved pin may be made of any desired length or diameter and may be made in one piece or in several parts which are secured together in any suitable manner according to the needs found for it, but for conventional map use it is contemplated that the length of the pin would be approximately one-fourth inch from bend to bend and the point would be about one-eighth inch longer. The head may be made of any desired size or shape.

It is obvious that various changes and modifications may be made in the details of construction and design of the above specifically described embodiment of this invention without departing from the spirit thereof, such changes and modifications being restricted only by the scope of the following claims:

What I claim is:

1. For use with a map having an opening therethrough, a map marking pin comprising a pair of convergent legs one of which is longer than the other, a resilient loop connecting said legs at their divergent ends, a point on the longer of said legs being turned outwardly away from the shorter of said legs at an angle of approximately 30°, said point being receivable through the opening in said map and the longer of said legs being adapted to be passed through the opening in said map and seat therebehind said resilient loop adapted to urge both of said leg members together to firmly grip the map lying therebetween, and indicating means carried by the shorter of said legs positioned to overlay the point of entry of said pin through the opening in said map and lying on the opposite side of said map from said point.

2. An improved map marking pin as claimed in claim 1 wherein the shorter of said legs carries a third leg connected thereto and upstanding from the lower end of said shorter leg at an angle of approximately 30° thereto and which carries on its free end said indicating means.

CHARLEY M. BLY.

REFERENCES CITED

The following references are of record in the file of this patent:

UNITED STATES PATENTS

| Number | Name | Date |
| --- | --- | --- |
| 391,996 | Wesson | Oct. 3, 1888 |
| 448,381 | Spierling | Mar. 17, 1891 |
| 486,192 | Keating | Nov. 15, 1892 |

OTHER REFERENCES

General Catalogue No. 8, Copyright 1937 of Frankfurth Hardward Co., Milwaukee, Wis. Item on page 675 of the above catalogue listed as No. K-9318.